Jan. 15, 1963 W. W. HAY ETAL 3,073,301
AVIATION QUICK RELEASE VALVE
Filed July 16, 1958 2 Sheets-Sheet 2

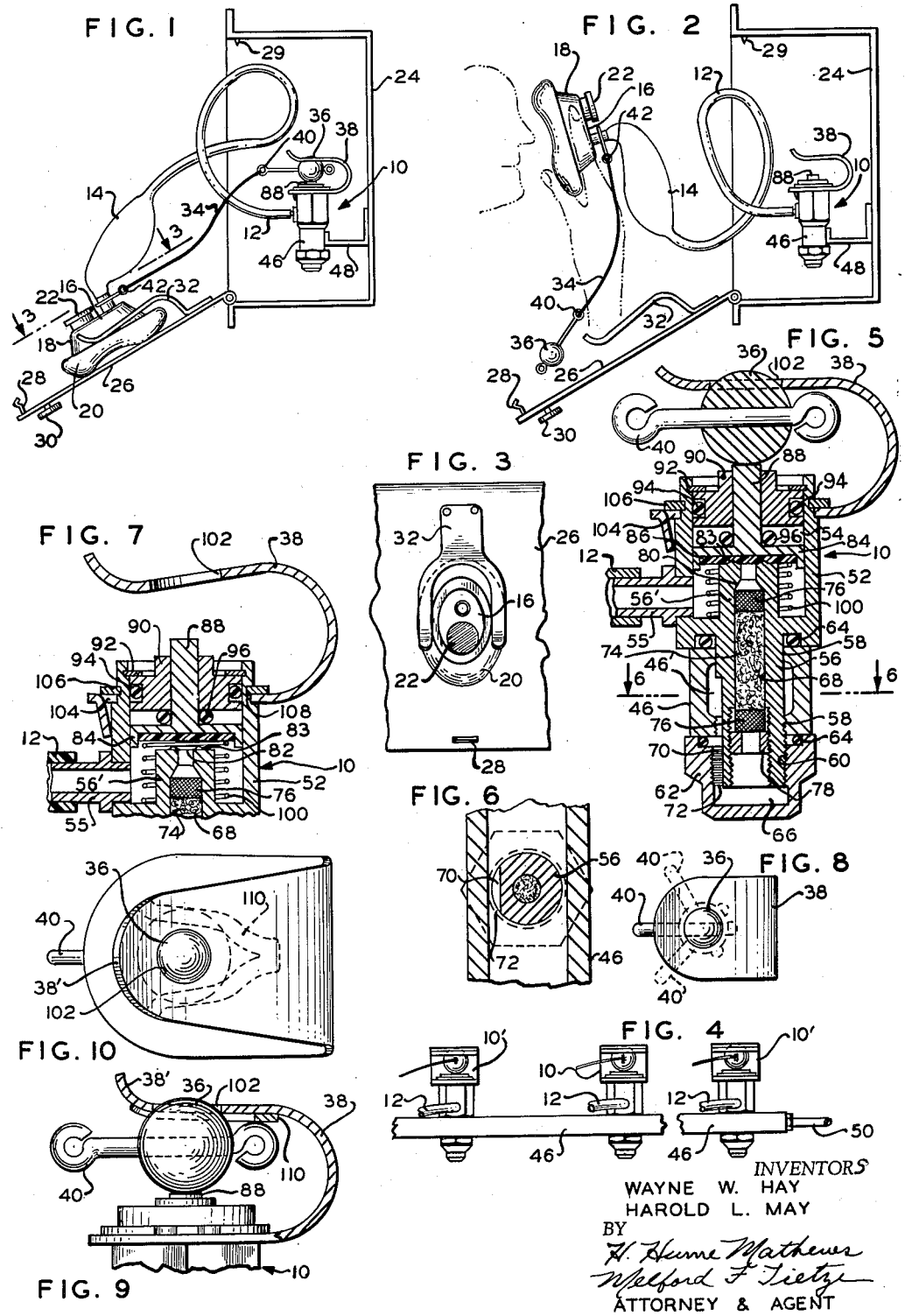

INVENTORS
WAYNE W. HAY
HAROLD L. MAY
BY
H. Hume Mathews
Melford F. Tietje
ATTORNEY & AGENT 3,073,301
AVIATION QUICK RELEASE VALVE
Wayne W. Hay and Harold L. May, Madison, Wis., assignors to Air Reduction Company, Incorporated, New York, N.Y., a corporation of New York
Filed July 16, 1958, Ser. No. 748,990
8 Claims. (Cl. 128—142)

This invention relates to apparatus for delivering respirable gases such as oxygen to users, and particularly to a system, and valve means for use therein adapted to facilitate the prompt delivery and discharge of oxygen under emergency conditions.

It has long been recognized in connection with air travel, both commercial and military, that the provision maintenance of a suitable supply of oxygen is necessary. This problem, in the infancy of air travel, was of negligible importance due to the prevailing relatively low altitude at which flights were customarily made during that period.

During World War II the difficulties of suitably furnishing oxygen to the passengers of aircraft were the subject of considerable concern, due to the desire, particularly for military purposes, to increase the operable altitudes of aircraft, thus rendering them more effective for accomplishing their intended objectives. At this stage of development, individual, or personal, oxygen systems were widely used in which an individual was furnished with a mask which was worn continuously during flight at altitudes above the minimum at which the supply of additional oxygen was found necessary. Such oxygen was furnished automatically either from an individual small oxygen container or by means of a system of delivery conduits which furnished the various occupants through individual outlets from a central storage supply of oxygen.

With the advent and drastic increase in commercial aviation, it has been found expedient also to continuously extend the operational altitudes of commercial flights, so that it is now common for commercial aircraft in daily commutation to fly at altitudes in the range of 20,000 to 30,000 feet. It has been found that, in order to supply the physiological needs of passengers, the partial pressure of oxygen in the atmosphere breathed should correspond at least to that existing at an altitude of about 12,000 feet. While temporary deficiencies of the oxygen constituent can be tolerated and flights above this altitude up to about 14,000 feet can be maintained for short durations, it is generally accepted that operational flights without provision for supplemental oxygen are limited substantially to this altitude. Commercial aircraft have met the need generally for oxygen supply by "pressurized cabins." Thus, most commercial aircraft and, for that matter, other aircraft as well, include suitable compressors which compress air from ambient atmosphere and maintain the pressure within the cabin at a pressure corresponding to a relatively low altitude, such, for example, as approximately 5,000 feet at which the partial pressure of the oxygen is entirely adequate for maintaining the needs of the occupants and to afford a desired degree of comfort.

In the present air age, with the advent of jet aircraft, the desire for more efficient operation of such planes has led to a desire to increase still further the operational altitudes of aircraft. It is contemplated that commercial jet aircraft will fly regularly at altitudes in the range of 40,000 to 50,000 feet. The needs of the passengers, with respect to the furnishing of oxygen for respiration, it is anticipated, will be furnished as before by maintaining the atmosphere within the cabin at a pressure corresponding to a relatively low altitude at which the atmosphere has a suitable partial pressure of oxygen for respiration. The drastic increases in the operational altitudes of aircraft have, however, created additional problems in connection with the supply of oxygen to the passengers which are either non-existent or are of much less severity at the substantially low altitude of flights that have heretofore prevailed. Thus, for example, it is readily apparent that the structure of the plane itself is subjected at such high altitudes to a much greater, outwardly exerted stress produced by the differential pressure between the relatively low ambient pressure and the cabin pressure which is maintained considerably above that value. Related to this problem is the further problem of avoiding and preventing any possibly rapid decompression of the cabin which could be occasioned by even a relatively small cabin puncture and which would result in a deficiency of oxygen to the occupants. This problem is a grave one, when it is considered that even a relatively small rupture of the cabin, such, for example, as the failure of a window port while flying at an altitude of 40,000 feet may be accompanied by decompression to a pressure below that capable of supporting the respiration of the occupants in an average size commercial aircraft within a matter of a few seconds. It is readily apparent, in the event of any such mechanical failure or accident by which rapid decompression of the chamber is possible, that even immediate action on the part of the pilot, such as by rapid descent to a low altitude, may not achieve the required low altitude in a sufficiently short time to avoid an extremely discomforting and possibly disastrous oxygen deficiency.

Accordingly, in order to keep stride with the recent achievement of jet or other air travel of extremely high altitude and to make such travel feasible without incurring undue hazard, it is considered essential that such aircraft, particularly of the type maintaining a pressurized cabin as a main source of respirable oxygen, be furnished with an auxiliary means of oxygen supply capable of being used effectively at substantially a moment's notice, in the case of an emergency arising from rapid chamber decompression, or a similar emergency in other types of aircraft created by a temporary or permanent failure of the main source of respirable oxygen.

Accordingly, it is an object of the present invention to provide an oxygen supply system particularly adapted for use in aircraft which is normally in an inoperable state, but which is quickly accessible and adapted for substantially immediate delivery of oxygen to the user.

Another object of this invention is to furnish such an oxygen supply system characterized by a high degree of dependability having a suitable face inhaler through which the oxygen is administered to the user and which is associated by means of a flexible conduit means with a normally closed delivery outlet valve of an oxygen source, the actuation of which is brought about automatically by the action of the user in applying the inhaler to his face during use.

Another object of the invention is to provide such an oxygen supply system having one or more such station outlet valves and connecting inhaler means for delivery of oxygen to one or more users wherein said outlet valves are normally held in closed position by a removable closure or locking device and having linkage means interconnecting the locking device with the inhaler such that the removal of the inhaler from its normal storage position for application to the face of the user results in extraction of the valve locking means, thus permitting the opening of the valve and delivery of the oxygen to the user.

Another object of the invention is to provide such an oxygen supply system having a flexible supply conduit arranged to accommodate movement of the inhaler from normal storage position to a position adapted for application to the face of the user and having a tension linkage member interconnecting the face mask and valve outlet locking means arranged to extract said locking means when said mask is placed in use.

It is another object of the invention to provide, in such an oxygen supply system, an improved valve means having a normally seated valve element, a portion thereof projecting externally of the valve for engagement with a removable locking means to normally hold said valve element in seated position, wherein said valve element is substantially free of frictionally acting means normally effective to create a gas seal from the ambient atmosphere and having means associated therewith effective upon movement of the valve element to open position to effectively seal said externally projecting portion and prevent the escape of gases from said valve to the atmosphere.

It is a still further object of the invention to provide such an improved valve means having a highly advantageous arrangement for retention of the valve locking means whereby said locking means may be readily inserted for safely readying said valve for use and which may be dependably extracted to permit opening of said valve regardless of the direction in which effort is applied for that purpose.

It is a still further object of this invention to provide an oxygen supply system for aircraft substantially as hereinabove described and having the further advantage of permitting a maximum degree of flexibility in arrangement and in accommodation of users such that such system, without material alteration, will readily accommodate substantially any desired number of outlet stations for the delivery of oxygen to individual passengers.

Other objects and advantages of the present invention will be more fully understood by reference to the following description of a preferred embodiment of the invention and the accompanying drawings, in which:

FIGURE 1 is a side view of a storage compartment for a delivery and administration outlet of an emergency oxygen supply system acording to a preferred embodiment of the proposed invention having a face inhaler mounted on the door of a compartment, shown in open position ready for use and showing a station outlet valve and gas conduit and actuating linkage means interconnecting said valve and mask inhaler;

FIGURE 2 illustrates the station outlet shown in FIGURE 1 and further shows the mask having been removed from its normal storage position as held for use, with the storage outlet value in open position;

FIGURE 3 is a front, partial elevational view looking at the inhaler mask and retaining means for mounting the mask in said compartment as seen in FIGURE 1;

FIGURE 4 is a front elevation view of the station outlet shown in FIGURES 1 and 2 illustrating the adaptability for the provision of a multiple number of station outlet valves and associated inhaler devices as seen in FIGURE 1;

FIGURE 5 is a vertical sectional view taken along the longitudinal axis of the station outlet valve seen in FIGURES 1 and 2 illustrating the internal construction thereof and the retractable valve closing means therefor;

FIGURE 6 is a transverse sectional view of the station outlet valve taken substantially along the line 6—6 in FIGURE 5 looking in the direction of the arrows;

FIGURE 7 is a partial view of the station outlet valve seen in FIGURE 5 showing the valve in its open position;

FIGURE 8 is a top view of the station outlet valve seen in FIGURE 5 showing the valve locking means and illustrating some permissable angular directions in which said locking means may be extracted to permit opening of the outlet valve;

FIGURE 9 is a side elevation view in section illustrating an alternative form of valve locking means;

FIGURE 10 is a top view of the alternative locking means seen in FIGURE 9;

Figure 13:
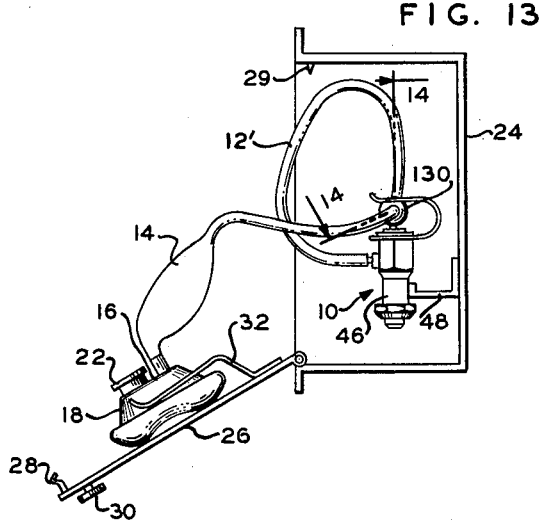
Figure 14:
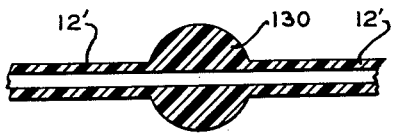

FIGURE 13 is a side view showing an alternative form of the emergency oxygen outlet seen in FIGURE 1 employing removable locking means for the outlet valve and actuating linkage therefor constituting a part of the conduit connecting the mask with the outlet valve; and FIGURE 14 is a sectional view taken along the line 14—14 in FIGURE 13 looking in the direction of the arrows showing the beaded construction of the supply conduit effective to provide a substantially spherically shaped locking means for normally holding closed the oxygen outlet valve.

In a preferred embodiment of the present invention shown in the drawings, FIGURES 1 and 2 represent a single station outlet of an oxygen supply system according to the invention, arranged within the cabin of an aircraft. Referring to these figures of the drawings, the station outlet consists of a station outlet valve 10 which is connected by means of a delivery conduit 12 and breathing bag 14 with the inlet of an inhaler, in the form of a face mask 16. It will be understood that the face mask may be any one of a number of relatively well known types, preferably including a relatively rigid cone portion 18 defining a breathing chamber when the mask is placed over the face of the user, and a flexible rim 20 which may be a hollow cushion or a ring of sponge rubber to facilitate the accommodation of the mask on the user's face. A conventional exhalation valve 22 may be arranged on the mask so that, with the mask in place, the user may inhale gases delivered through the conduit 12 and breathing bag 14 and discharge the exhalation gases through the valve 22. In such arrangement the mask would also include a conventional inhalation check valve (not shown) in its inlet allowing delivery of oxygen to the mask only during inhalation. The bag 14 is preferably furnished so as to accumulate the oxygen which continues to be delivered during the user's exhalation phase and also so that the rate of continuous supply from the station outlet may be at a convenient average rate of consumption. It will be understood that the use of the conventional inhalation and exhalation check valves as above described permit the administration of undiluted oxygen to the user. However, the check valves may be omitted in which case some dilution of the delivery oxygen occurs. Although the former system is considered preferable, the latter is thought to be suitable for use in emergency supply of oxygen as described herein.

As an illustration of a convenient manner in which the station outlet might be arranged, it is shown in FIGURES 1 and 2 as being disposed within a cabinet 24 having a front opening door 26, a friction latch 28 and catch 29, thus affording a compartment in which the station outlet is conveniently housed and concealed until its use is required and thus protected from in advertent use or accidental damage during storage. The compartment door 26 is provided with a handle 30 to facilitate manual opening of the door when the use of the emergency oxygen supply is necessary.

While the present apparatus has been illustrated as having a manual opening device to permit accessibility to the emergency oxygen outlet, it is believed preferable to provide some automatic means responsive to conditions within the aircraft under circumstances in which there is a deficiency of the normal supply of respirable oxygen to open the door of the cabinet. With such an automatic means, it is readily apparent that each of the outlet stations would open immediately when the need arises, thus avoiding the necessity of thought or action on the part of the passengers and consequently saving valuable time in such an emergency. It is possible, for example, to afford such automatic opening means by applying a spring or other resilient means to the door of the cabinet acting in the direction to open the door and to furnish, in association with the latch mechanism holding the door in closed position, a suitable aneroid control which is responsive at a drop in pressure below a predetermined level to allow the latch to release, thus permitting the door to be swung to its open position under the influence of the resilient means acting thereon. Obviously, numerous other automatic means may be provided to accomplish this result.

The face mask may be mounted within the compartment in any suitable fashion. It may be mounted advantageously as shown in the drawings by means of a U-shaped spring clip 32 whose bifurcated ends extend along the sides of the face mask and frictionally act against the rim portion thereof to hold it in place against the front cover of the storage compartment. The mask may readily be removed from its normally mounted position by grasping it and moving it downwardly from under the spring retaining clip 32. During such movement of the face mask by the user, tension is applied through an interconnecting linkage cord or chain 34 to a spherical locking element 36 which is normally held by means of a spring clasp 38 at the top of the station outlet valve 10 and is effective, normally, to maintain the station outlet valve in closed position. It may be seen that the connecting linkage 34 is attached to the spherical locking element by means of an elongated pin 40 and is attached to the face mask by means of a ring 42 which is secured in a suitable fashion to the mask body. As will be more fully described hereinafter, the length of the connecting linkage 34 is arranged such that the movement of the face mask by the user from its normal mounted position pulls the spherical locking element from the position shown in FIGURE 1, thus allowing the station outlet valve 10 to open and permit the flow of oxygen to the face mask. The action above described by which the station outlet valve is opened by the user is illustrated in FIGURE 2. Under the conditions illustrated in this figure, oxygen has commenced flow to the face mask and the mask is ready for use merely by placement against the face of the user.

The compartment 24 in which the station outlet is arranged may, of course, be placed within the cabin of the aircraft at one or more desirable, convenient locations. Thus, for example, it is contemplated that compartments such as that shown in 24 may be placed overhead of each of the passengers' seats of an airplane, preferably with the compartment recessed so that the front face and cover thereof are flush with the overhead partition. Similarly such compartment might be recessed within the back of the seat ahead of each occupant. To conveniently deliver oxygen to the station outlets, each valve is desirably mounted in a distributing manifold 46 which, it will be seen, extends transversely of the compartment and may be supported therein in any convenient way such as by means of a bracket 48. A plurality of station outlet valves such as those shown at 10' in FIGURE 4 may be mounted and connected in each of the manifold bars, thus permitting the accommodation of adjacent passengers from one compartment. It will be understood, of course, that each such station outlet valve will be provided with a corresponding mask inhaler and associated actuating linkage and delivery conduit means as shown in FIGURES 1 and 2. Each manifold bar, in turn, is connected by any suitable conduit such as the conduit 50 seen in FIGURE 4 to a main supply of oxygen. Thus, in an aircraft there may be one or more main supply conduits leading, from a central oxygen source, along the length of the fuselage into which each of the individual manifolds 46 may be connected along the length of the cabin, thus permitting any desired number of stations to be conveniently located for use by the passengers.

In contemplating the illustrative arrangement shown in FIGURES 1 and 2, it should be borne in mind that the illustrations of the valve and face mask and other associated parts need not necessarily be in the relative sizes or proportions shown in the drawing. Actually, a station outlet valve device constructed in accordance with a preferred embodiment of this invention may be substantially smaller in proportion to the normal size of the face mask, so that the entire unit may be provided in a small space. Similarly, the face mask need not be of the specific type illustrated. It will be understood, however, that any mask employed is desirably constructed to provide a dependable means of securing the interconnecting linkage 34, or other linkage element, so that the user, by removing the mask from its normally mounted position, may effect the transmission of tension through the linkage to thus remove the valve locking element 36. As will be apparent hereinafter, such construction is such that only a relatively slight tension is required for this purpose.

The face mask is mounted on the compartment door 26 to permit its easy removal, but at the same time to prevent the possibility of its being removed and made available for application to the face of the user without simultaneously causing the valve 10 to be opened. It may be seen that this is an important consideration, since otherwise the user may, in the mistaken belief that the mask is in operation, attempt to use or rely upon it for the supply of oxygen in an emergency and thus be without an adequate supply thereof. This is accomplished in the present apparatus by making the linkage 34 connecting the mask with the removable locking ball 36 of a suitable length, such that the hinge door may be rotated between the closed and open positions without restriction, but at the same time such that, when the door is open, the movement of the mask necessary to remove it from the security of the retaining clasp 32 exceeds the slack in the length of the connecting linkage 34. Consequently, removal of the face mask for use inherently requires an extraction of the locking ball 36, causing the valve 10 to open substantially simultaneously with such manipulation of the mask.

It will be evident, of course, that should the mask not be removed from its normal place of storage the oxygen valve will not be opened. Consequently, those outlets located at seats not occupied by passengers will remain closed and will not wastefully discharge oxygen whose use is not required.

It will be apparent, because of the hinged movement of the door of the compartment on which the mask is mounted, that at the upper positions of the door, a greater movement of the mask is possible before the slack of the linkage 34 is exceeded or before the valve 10 must necessarily be caused to open. It is obvious, however, that at the extreme limit of the upper position of the door the mask will not be accessible to the user because of the small opening, and that the door must at least be lowered to a sufficient extent for the user to use his hand in order to grasp the mask. From such position and for any subsequent position of the door, the required relationship with respect to the movement of the mask and the length of the connecting linkage 34 is readily obtainableble by making the arms of the retaining clip 32 of sufficient length that the mask will not be capable of use until the slack of the linkage 34 has been exceeded and the valve 10 caused to open.

The construction of the station outlet valve 10 may best be seen by reference to FIGURES 5, 6 and 7. The body 52 of the valve housing may be formed of a cylindrical metal stock having a bore extending inwardly from its upper end to form a valve chamber 54. A delivery outlet 55 connects with the valve chamber and forms a fitting for receiving the flexible conduit 12 connecting with the face mask. A tubular shank 56 projects outwardly from the bottom of the main valve body through a bore 58 which forms a vertical opening through the manifold bar 46 for accommodation of the station outlet valve. The lower, threaded end 60 of the valve shank is received in an end cap 62 that threads on the shank and effectively secures the valve to the manifold by gripping the manifold bar between the main portion of the valve and the end cap. Suitable O-ring sealing means 64 disposed in grooves in the face of the valve body 52 and in the end cap 62 are compressed against the upper and lower faces of the manifold bar around the bore 58 to form gas-tight sealing means. The manifold defines a longitudinal manifold chamber 46' running the entire length of the manifold. The back cap 62 defines an inlet space 66 at the lower end of the valve shank which is in confronting relation to the inlet bore 68 extending therethrough. The manifold chamber and the inlet gas space 66 are connected to permit the access of oxygen to the inlet of the valve by a connecting passage 70 formed by a flattened portion of the circumference of the shank 66 as may best be seen in FIGURE 6. The inlet bore 68 contains a length thereof filled with a suitable porous filter 74 adapted to prevent the accession of foreign particles to the working parts of the valve and to other downstream portions of the delivery system and to provide a metering element for the control of flow rate. The filter material 74 may be stainless or glass steel wool, or any other suitable material which is conventionally used for this purpose. Preferably, the filter is retained between porous end blocks 76, the outer end of which is urged inwardly by means of a threaded retaining ring 78 to compress the assemblage against a shoulder 80 formed by a reduction of the inlet bore 68 at its inner end. Control of the degree of compression of the filter material 74 can conveniently provide a desired degree of metering, thus controlling the rate of gas flow when the valve is opened.

An extension of the shank 56 projects upwardly into the valve chamber 54 in the form of a boss 56' at its upper end and forms a valve face 82 having an annular nozzle edge 83. A valve element in the form of a plunger 84 is arranged for longitudinal movement within the valve chamber and is provided with a gasketed valve seat 86 which is arranged to be received against the valve nozzle 83 in the normally seated position of the valve element and thus close off the valve inlet 68. A stem 88 of the valve element extends through an end plate 90 situated within the open end of the valve body and is urged inwardly toward normal closed position under the influence of the U-spring clip 38 through the interposed ball closure or locking element 36. The end plate 90 is retained within the valve bore by conventional expansion clips 92 and serves to assist in guiding the valve element during its longitudinal displacement. An O-ring 94 is arranged in a peripheral groove of the end plate to form a gas-tight seal between the end plate and the surrounding walls of the valve bore. A conventional type of O-ring 96 is carried on the stem 88 of the valve element. The O-ring 96 is of such a diameter that it fits fairly snugly around the valve stem. It may be seen in this construction that the valve stem 88 is provided with a longitudinal sliding fit in the valve end plate 90 and that there is no conventional type of valve stem packing surrounding the valve stem and acting thereon to provide a gas seal. When the valve element is moved to its outermost position corresponding to the open condition of the valve, the O-ring 96 is compressed against the inner face of the end plate 90, creating a gas-tight seal that prevents the seepage of gas from the valve chamber around the valve stem. Thus, in effect, the valve element 84 is equipped with a "floating seal" which is ineffective in the closed position of the valve but which is rendered effective when the valve element moves to open position. Such construction is of particular importance in the present valve device, wherein there must be no interference with the proper opening of the valve when the delivery of oxygen therefrom is desired. This is particularly important in that this type of valve anticipates infrequent usage whereby ordinary types of seals or packing may tend to "stick." It will be apparent that, in this construction, the valve sealing means 96 imparts absolutely no friction against the valve stem which is effective to restrain in any way opening movement of the valve and that the sealing means is effective only when it is required while the valve is open. Of course, as long as the valve seat is closed, there will be substantially no gas pressure within the valve chamber 54 so that such sealing means around the valve stem in the presence construction is not required.

The valve 10 is equipped with a compression spring 100 which is compressed against the bottom of the valve chamber 54 when the valve element 84 is in closed position, as seen in FIGURE 5. The compression of the spring 100, together with any gas pressure acting on the valve element from the inlet bore 68, supplies the force sufficient to open the valve. Acting in the opposite direction and effective to retain the valve element in closed seated position is a closing force exerted by the tension of the U-spring 38 acting downwardly against the projecting end of the valve stem through the ball closing element 36. It will be seen that a circular opening 102 is formed in the upper leg of the U-spring 38 in substantially axial alignment with the valve stem 88 and of a smaller diameter than the diameter of the ball 36. The opening 102 thus serves as a detent for aligning and holding in place the ball 36 in position over the valve stem 88. The lower leg of the spring 38 has an opening which is received over the cylindrical end of the valve body 52. The bottom of the spring rests against a shoulder 104 formed on the valve body. The spring is secured in place by a conventional spring clip 106 which is seated in an annular groove 108 in the valve body. It will be understood that the construction of the U-spring 38 and the degree of expansion of its upper leg which is required to insert the ball closing element 36 is preferably such that the resultant closing force exerted thereby is effective to maintain the valve in closed position, but does not exceed a value which will make it necessary to exert any inordinate force against the ball element 36 to remove it from the position shown in order to allow the valve 10 to open. It will be evident also, of course, by suitably proportioning detent opening 102 as well as by selecting a desired spring tension, that the force required to extract the ball 36 may be varied as desired. A smaller opening will, of course, permit extraction of the ball with a relatively smaller force.

It is significant in the present construction that the locking element which normally maintains the valve 10 in closed position may be easily removed from its locking position without requiring any specific degree of care or skill for this purpose. Otherwise, the valve device at the very movement of its urgent need might frustrate the attempt of the average person unfamiliar with its specific structural details and defeat its purpose. The present construction is highly advantageous in this regard, since it will be seen that the valve may be caused to open by the exertion of a predetermined relatively small tug, which will be inherently applied to the locking element 36 merely by the operation of picking up the face mask preparatory to its use, as hereinabove mentioned. To further avoid any possible difficulties in this stage of the operation, the locking means is advantageously provided in the form of a spherical ball element 36 which, it will be seen, forms a universal connector capable of actuation substantially from any direction. Thus, as illustrated in the top view of FIGURE 8, the ball element may swivel in its sealing opening 102 depending upon the direction in which tension is applied thereto through the linkage member 34 and may be pulled out of this detent without necessitating such force to be applied from any specific direction.

In order to facilitate resetting of the ball closure element 36, the closing spring 38 may be provided with a V-shaped guide element 110 seen in FIGURES 9 and 10. The V-shaped guide element may be in the form of a thin strip soldered to the lower face of the spring or it may also be formed by pressing an indentation into the spring itself. In either event, it will be seen that when the ball, upon resetting the valve, is pressed into the open end of the spring, the outer end of which is curved upwardly as seen in 38′, the ball is readily guided toward the opening 102 and that, by such continued movement, the ball is automatically placed in its desired position where it is effective to close the valve. It will be seen, of course, that such construction for facilitating insertion of the ball in no way interferes with its desired universal feature of operation for opening the valve.

Figure 12:
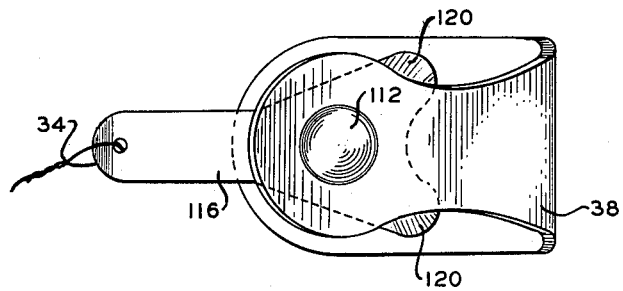
FIGURE 12 is a top view of the valve locking means seen in FIGURE 11.
Figure 11:
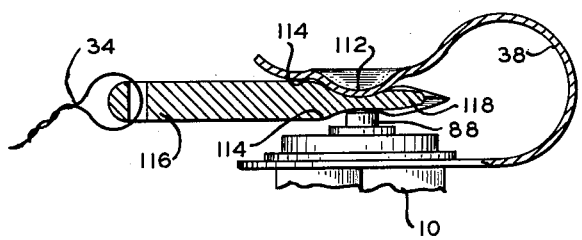
FIGURE 11 is an elevation view in section showing another alternative construction of valve locking means.

Another alternative arrangement for a valve closure means is seen in FIGURES 11 and 12. In this arrangement, the spring 38, instead of having an opening for removing the ball element, is provided with a spherical embossment 112 which is adapted to be seated in a corresponding spherical depression formed in a locking pin 116 to which the actuating link 34 is connected. The pin 116 is symmetrically shaped and has a similar spherical depression 114 in its lower side within which the upper end of the valve stem 88 is received. In the position shown in FIGURE 11, the pin 116 is held in place by the detent action of the spring, and the spring 38 acting downwardly through the pin serves to depress the stem 88 and hold the valve in closed position. Insertion of the pin 116 into its locking position is facilitated by providing a depression at the inner end of the pin wherein the central position of the pin, as illustrated by the cross-sectioned area 118, is of less thickness than the outer edges of the pin, as represented by the projections 120 seen in FIGURE 12. Accordingly, between the outer projections 120 there is formed somewhat of a groove leading to the depression 114. Thus, the pin is inserted readily merely by bringing the inner end of the pin up to the mouth of the spring and permitting the embossment 112 of the spring to enter between the ends 120, which, upon a slight further insertion, permits the embossment to snap into its corresponding depression 114. It will be seen, of course, that since the pin 116 is symmetrical such insertion may be made with either side of the pin faced upwardly. The inner depressed part of the pin 116, as above described, permits a desirable degree of movement of the pin to easily accommodate removal forces acting from substantially any direction.

An alternate form of construction for effecting the opening of the emergency outlet valve is seen in FIGURES 13 and 14. Referring thereto it will be seen that in place of the separate linkage cord or chain shown at 34 in the above-described embodiment the oxygen delivery conduit 12′ itself is arranged to constitute the actuating linkage means. Thus, in this embodiment, the station outlet is essentially identical to that shown in FIGURE 1 with the exception, however, that the oxygen delivery conduit 12′ has formed, along the length thereof, or attached in some way thereon, a spherical bead member 130 which performs the same functions as the ball locking element 36 shown in FIGURES 1 and 5. The ball element 130 may be formed by molding such a configuration in the tube forming the conduit 12′ such as illustrated in FIGURE 14. It will be seen that, in this event, the length of the delivery conduit and collection bag 14, lying between the face mask and the locking element 130, is determined in accordance with the same objective used in determining the desired length of the actuating linkage shown in FIGURE 1. Thus, the length of conduit is such that removal of the mask from its mounted position on the door of the cabinet inherently requires the application of tension to the delivery conduit and the removal of the spherical element 130 from its position under the closing leaf spring 38 of the outlet valve. In this arrangement, it may be seen that the necessary actuating force for permitting the emergency outlet valve to open is transmitted through the gas connection means which, accordingly, subjects these parts to certain stresses and a tendency to wear which does not exist in the embodiment shown in FIGURE 1, hereinabove described. The arrangement of FIGURE 1 is considered to be preferable. It will be evident also that the provision of the separate linkage means, such as the cord or chain 34, for effecting the removal of the locking element of the oxygen outlet valve provides an additional device evidencing the necessity for reinsertion of the locking device when the mask is replaced after use or testing, thus further insuring that the valve is properly reinstated in readiness for subsequent use.

Having now described in detail certain embodiments of an emergency oxygen supply system, in accordance with the present invention, the operation thereof may be described as follows.

Under ordinary conditions, when there is no need for furnishing or augmenting a supply of oxygen to a potential user, such as a passenger, in a high altitude aircraft, the various delivery or station outlets will be arranged substantially as in FIGURE 1 except that the door or other closure for the housing of the station outlet will ordinarily be closed. It may be seen in this figure that a space is provided within the compartment of the cabinet 24 to accommodate the inward projection of the face mask and the connecting breathing bag and gas conduit when the hinged compartment door 26 is in closed position. It will be seen, of course, that under these conditions the manifold 46 is nevertheless in continuous communication with an ample emergency supply of oxygen.

Assuming now that an emergency situation arises such, for example, as an accidental rapid decompression of the aircraft cabin, the passengers will ordinarily be immediately alerted by adequate safety alarm means to know that immediate recourse should be made to the respective emergency supply outlets. Then, by grasping the handle 30, or by automatic means such as above described, the respective compartments are quickly opened by the lowering of the door 26. The mask 16 then is grasped in either hand and pulled from its mounting and applied to the face of the user. It will be seen that this will be done without any requisite skill or extensive instruction and that the performance of these acts can be carried out within an extremely short space of time of less than a few seconds.

As previously described, the action of the user in pulling the face mask from its mounting on the compartment door applies an actuating force through the connecting linkage 34, or through the conduit 12′ in FIGURE 13, causing the valve closing or locking element 36, or the element 130 in FIGURE 13, to be pulled from its seated position, whereupon the station outlet valve connected to the mask is immediately opened under the opening force exerted by the compression spring 100 and gas pressure in the inlet bore as seen in FIGURE 5. Opening of the valve element, in turn, creates an additional gas seal around the valve stem, thus prohibiting the seepage of gas from the valves while it is in operation to supply oxygen to the user. It will be seen, of course, that oxygen is delivered from the valve at a continuous rate, filling the breathing bag 14 during the periods when the user exhales from the mask through the exhalation valve 22 and thus furnishing the desired volume to the user upon his successive inhalation. Such action may be continued for any necessary period of time and under ordinary circumstances, where such decompression would occur, would be necessary until the aircraft has descended to a sufficiently low altitude that comfortable breathing by the passengers is possible without the necessity of reliance upon the emergency oxygen supply.

The outlet stations are easily replaced and set in order for subsequent use by returning the mask to its initial position under the retaining clip 32 seen in FIGURE 1. The outlet valve 10 is shut off at this time by reinsertion of the ball element 36, shown in FIGURE 1, or spherical portion 130 in FIGURE 13, underneath the spring retaining clip 38. It will be seen as an additional advantage of the arrangement herein described that the provision of the separate connecting linkage and closure element 36 will avoid the inadvertent return of the mask without also effecting closure of the outlet valve 10. This is brought about by the mere fact that the closure element 36 will hang downwardly away from the mask when it is returned to its normal position, bringing to the attention of the user or attendant the necessity for returning this element to its customary position.

In addition, of course, it is not possible with the arrangement of the present invention, involving the use of an emergency valve normally biased toward open position, to close the valve without inherently triggering the valve for subsequent release, since the valve only may be closed by reinsertion of the locking means as above described. Consequently, each station of necessity must deliver emergency oxygen at any time that the mask is taken from its normal mounted position in the course of use. Once it is properly returned to its place under the retaining spring to effect closure of the station outlet valve, the door of the storage compartment may then be closed and the apparatus is in complete readiness for any possible subsequent emergency.

It is to be understood that the invention is not limited to the specific embodiment herein illustrated and described, but may be used in other ways without departure from its spirit as defined by the following claims.

We claim:

1. In an emergency oxygen supply system having a station outlet valve including a gas inlet and delivery outlet and a valve element therebetween movable to open and closed positions, respectively, to open or close said valve, a face inhaler for administering oxygen to a user, and conduit means connecting said valve outlet with said inhaler, means biasing said valve element toward open position to allow the delivery of oxygen to said inhaler, locking means operable to oppose said valve biasing means and normally maintain said valve element in closed position, said locking means including a spring member adapted to resiliently urge said valve element toward closed position and a substantially spherical member removably interposed between said spring member and said valve element and linkage means forming a connection, having a maximum predetermined length, between said spherical locking member and said inhaler operable upon predetermined displacement of said inhaler to disarm said locking means and render it ineffective to oppose said valve biasing means.

2. In an emergency oxyen supply system having a station outlet valve including a gas inlet and delivery outlet and a valve element therebetween movable to open and closed positions, respectively, to open or close said valve, a face inhaler for administering oxygen to a user, and conduit means connecting said valve outlet with said inhaler, means biasing said valve element toward open position to allow the delivery of oxygen to said inhaler, locking means operable to oppose said valve biasing means and normally maintain said valve element in closed position, and means forming a connection between said locking means and said inhaler operable upon predetermined displacement of said inhaler to disarm said locking means and render it ineffective to oppose said valve biasing means, said locking means including a spring member resiliently urging said valve element toward closed position and a substantially spherical member forming a part of said conduit removably interposed between said spring member and said valve element, said spherical portion being disposed along the length of said conduit a predetermined distance from said inhaler such that, upon predetermined displacement of said inhaler, tension transmitted through said conduit is effective to remove said spherical member and permit said valve to open.

3. A gas delivering apparatus for supplying a respirable gas comprising an inhaler, a normally closed supply valve, conduit means connecting said supply valve with said inhaler for delivering a respirable gas to said inhaler when said valve is open, means normally biasing said valve toward open position, removable locking means normally maintaining said valve in closed position said locking means including a spring member adapted to resiliently urge said valve toward closed position and a substantially spherical member interposed between said spring member and said valve, and linkage means forming a separate tension transmitting connection of predetermined maximum length between said inhaler and said locking means effective upon movement of said inhaler more than a predetermined distance away from said supply valve to remove said locking means and allow said valve to move to open position.

4. A gas delivering apparatus for supplying a respirable gas comprising an inhaler, mounting means for releasably mounting said inhaler in a normally inoperative position, a normally closed supply valve having a valve element movable between open and closed positions and an externally projecting valve stem operatively connected with said valve element, conduit means connecting said supply valve with said inhaler for delivering a respirable gas to said inhaler when said valve is open, means normally biasing said valve toward open position, removable locking means including a spring and a removable locking element interposed between said valve stem and said spring effective to transmit a closing force exerted by said spring to said valve element thereby normally maintaining said valve in closed position and linkage means of a predetermined length forming a connection between said inhaler and said locking means such that the removal of said inhaler from said mounting means incurs a displacement thereof sufficient to remove said locking means and allow said valve to move to open position.

5. A gas delivery apparatus according to claim 4 wherein said spring includes detent means effective to align said locking element with said valve stem and to maintain said locking element in position so as to normally maintain said valve closed, but to permit removal of said locking element upon exertion of a predetermined force acting thereon through said linkage means.

6. A gas delivery apparatus according to claim 5 wherein said removable locking element includes a substantially spherically shaped surface and said spring includes means for accommodating said spherical surface effective to permit relative rotation therebetween and allow removal of said locking element in response to force exerted through said linkage means independently of the direction in which said force is exerted.

7. A valve for dispensing gas comprising a valve housing defining a valve chamber having a gas inlet and a delivery outlet, a valve seat arranged between said inlet and outlet, a valve element disposed within said chamber movable toward and away from said seat to open or close said valve, opening spring means biasing said valve element away from said seat, an actuating stem operably connected with said valve element projecting externally of said housing, a removable locking element engageable with said stem, and spring means acting against said removable locking element effective to oppose said opening spring means and normally hold said valve element against said seat, said spring means comprising a spring secured to said valve housing and having a portion overlying the projecting end of said actuating stem, said removable locking means comprising a spherical member and said overlying spring portion including detent means effective to receive said spherical locking member therein and position it in alignment with said actuating stem.

8. A valve for dispensing gas according to claim 7 wherein said locking element comprises a generally ball-like member and said detent means comprises a receptacle having an opening substantially smaller than the diameter of said ball member disposed substantially in axial alignment with said valve stem and spaced therefrom such that said spring is placed under compression upon positioning of said ball member between said spring and said stem to create a closing force sufficient to hold said valve in closed position.

References Cited in the file of this patent

UNITED STATES PATENTS

| | | |
|---|---|---|
| 2,266,939 | Thomas | Dec. 23, 1941 |
| 2,435,040 | Heidbrink et al. | Jan. 27, 1948 |
| 2,809,633 | Swearingen et al. | Oct. 15, 1957 |
| 2,813,546 | Amison | Nov. 19, 1957 |
| 2,831,607 | Berndt | Apr. 22, 1958 |
| 2,924,423 | Weiser et al. | Feb. 9, 1960 |
| 2,931,355 | Miller et al. | Apr. 5, 1960 |